United States Patent
Cohen et al.

(10) Patent No.: US 8,203,560 B2
(45) Date of Patent: Jun. 19, 2012

(54) METHOD FOR PREDICTIVELY SPLITTING PROCEDURALLY GENERATED PARTICLE DATA INTO SCREEN-SPACE BOXES

(75) Inventors: Jonathan Cohen, Ann Arbor, MI (US); Chris Allen, Los Angeles, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 1026 days.

(21) Appl. No.: 12/111,066

(22) Filed: Apr. 28, 2008

(65) Prior Publication Data

US 2008/0266299 A1 Oct. 30, 2008

Related U.S. Application Data

(60) Provisional application No. 61/042,567, filed on Apr. 4, 2008, provisional application No. 60/926,588, filed on Apr. 27, 2007.

(51) Int. Cl.
G06T 13/00 (2011.01)
G06F 7/60 (2006.01)
G06F 17/10 (2006.01)

(52) U.S. Cl. ............ 345/473; 345/474; 345/958; 703/2

(58) Field of Classification Search .................. 345/473, 345/474, 958; 703/2, 6
See application file for complete search history.

(56) References Cited

U.S. PATENT DOCUMENTS

| | | | | |
|---|---|---|---|---|
| 5,572,634 A * | 11/1996 | Duluk, Jr. | | 345/419 |
| 5,625,575 A * | 4/1997 | Goyal et al. | | 703/6 |
| 6,208,357 B1 * | 3/2001 | Koga et al. | | 345/473 |
| 6,717,576 B1 * | 4/2004 | Duluk et al. | | 345/419 |
| 7,167,171 B2 * | 1/2007 | Heim et al. | | 345/418 |
| 7,403,202 B1 * | 7/2008 | Nash | | 345/474 |
| 7,865,857 B1 * | 1/2011 | Chopra et al. | | 716/119 |
| 2001/0048433 A1 * | 12/2001 | Rubin | | 345/418 |
| 2002/0039100 A1 * | 4/2002 | Morphet | | 345/553 |
| 2002/0149622 A1 * | 10/2002 | Uesaki et al. | | 345/764 |
| 2003/0179203 A1 * | 9/2003 | Bruderlin et al. | | 345/473 |
| 2004/0100465 A1 * | 5/2004 | Stowe et al. | | 345/427 |
| 2005/0052461 A1 * | 3/2005 | Vassilev et al. | | 345/473 |
| 2005/0253854 A1 * | 11/2005 | Lischinski et al. | | 345/474 |
| 2006/0149516 A1 * | 7/2006 | Bond et al. | | 703/6 |
| 2006/0217945 A1 * | 9/2006 | Leprevost | | 703/2 |
| 2007/0035547 A1 * | 2/2007 | Anderson et al. | | 345/473 |
| 2008/0243452 A1 * | 10/2008 | Bowers et al. | | 703/2 |

OTHER PUBLICATIONS

U.S. Appl. No. 61/042,567, filed Apr. 4, 2008; Inventors Cohen et al.; entitled "Method for Predictively Splitting Procedurally Generated Particle Data Into Screen-Space Boxes"; all pages.
U.S. Appl. No. 60/926,588, filed Apr. 27, 2007; Inventors Allen et al.; entitled "Rendering Tons of Sand"; all pages.

* cited by examiner

Primary Examiner — David T Welch
(74) Attorney, Agent, or Firm — Fitch, Even, Tabin & Flannery, LLP

(57) ABSTRACT

A method for use in rendering includes receiving an input particle system, an instancing program, and a number indicating a maximum number of particles to be stored in memory, providing an input particle count representative of at least a portion of the input particle system to at least one operator for the instancing program, running the at least one operator in a prediction mode to generate an output particle count, comparing the output particle count to the number indicating a maximum number of particles to be stored in memory, and spatially splitting a bounding box representative of the input particle count in response to the output particle count being greater than the number indicating a maximum number of particles to be stored in memory.

24 Claims, 7 Drawing Sheets

US 8,203,560 B2

METHOD FOR PREDICTIVELY SPLITTING PROCEDURALLY GENERATED PARTICLE DATA INTO SCREEN-SPACE BOXES

CROSS-REFERENCE TO RELATED APPLICATIONS

This application claims the benefit of both U.S. Provisional Patent Application No. 61/042,567, filed Apr. 4, 2008, entitled "METHOD FOR PREDICTIVELY SPLITTING PROCEDURALLY GENERATED PARTICLE DATA INTO SCREEN-SPACE BOXES," and U.S. Provisional Patent Application No. 60/926,588, filed Apr. 27, 2007, entitled "RENDERING TONS OF SAND," the entire disclosures of which are both hereby fully incorporated herein by reference in their entireties.

BACKGROUND OF THE INVENTION

1. Field of the Invention

The present invention relates generally to computer graphics and animation, and more specifically to rendering large sets of particle data.

2. Discussion of the Related Art

Computer animation is increasingly being used in movies, motion pictures, television, video games, etc. Rendering is the process of generating an image on a display screen from a model. A wide variety of rendering products are available. Some are integrated into larger modeling and animation packages, some are stand-alone, and some are free open-source projects.

SUMMARY OF THE INVENTION

One embodiment provides a method for use in rendering, comprising: receiving an input particle system, an instancing program, and a number indicating a maximum number of particles to be stored in memory; providing an input particle count representative of at least a portion of the input particle system to at least one operator for the instancing program; running the at least one operator in a prediction mode to generate an output particle count; comparing the output particle count to the number indicating a maximum number of particles to be stored in memory; and spatially splitting a bounding box representative of the input particle count in response to the output particle count being greater than the number indicating a maximum number of particles to be stored in memory.

Another embodiment provides a storage medium storing a computer program executable by a processor based system, the computer program causing the processor based system to execute steps comprising: receiving an input particle system, an instancing program, and a number indicating a maximum number of particles to be stored in memory; providing an input particle count representative of at least a portion of the input particle system to at least one operator for the instancing program; running the at least one operator in a prediction mode to generate an output particle count; comparing the output particle count to the number indicating a maximum number of particles to be stored in memory; and spatially splitting a bounding box representative of the input particle count in response to the output particle count being greater than the number indicating a maximum number of particles to be stored in memory.

Another embodiment provides an apparatus for use in rendering, comprising: means for receiving an input particle system, an instancing program, and a number indicating a maximum number of particles to be stored in memory; means for providing an input particle count representative of at least a portion of the input particle system to at least one operator for the instancing program; means for running the at least one operator in a prediction mode to generate an output particle count; means for comparing the output particle count to the number indicating a maximum number of particles to be stored in memory; and means for spatially splitting a bounding box representative of the input particle count in response to the output particle count being greater than the number indicating a maximum number of particles to be stored in memory.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Reyes rendering is a computer software architecture/algorithm used in three-dimensional (3D) computer graphics to render photo-realistic images. Reyes is an acronym for "Renders Everything You Ever Saw." One implementation of the Reyes algorithm is Pixar's RenderMan® product.

Figure 1:
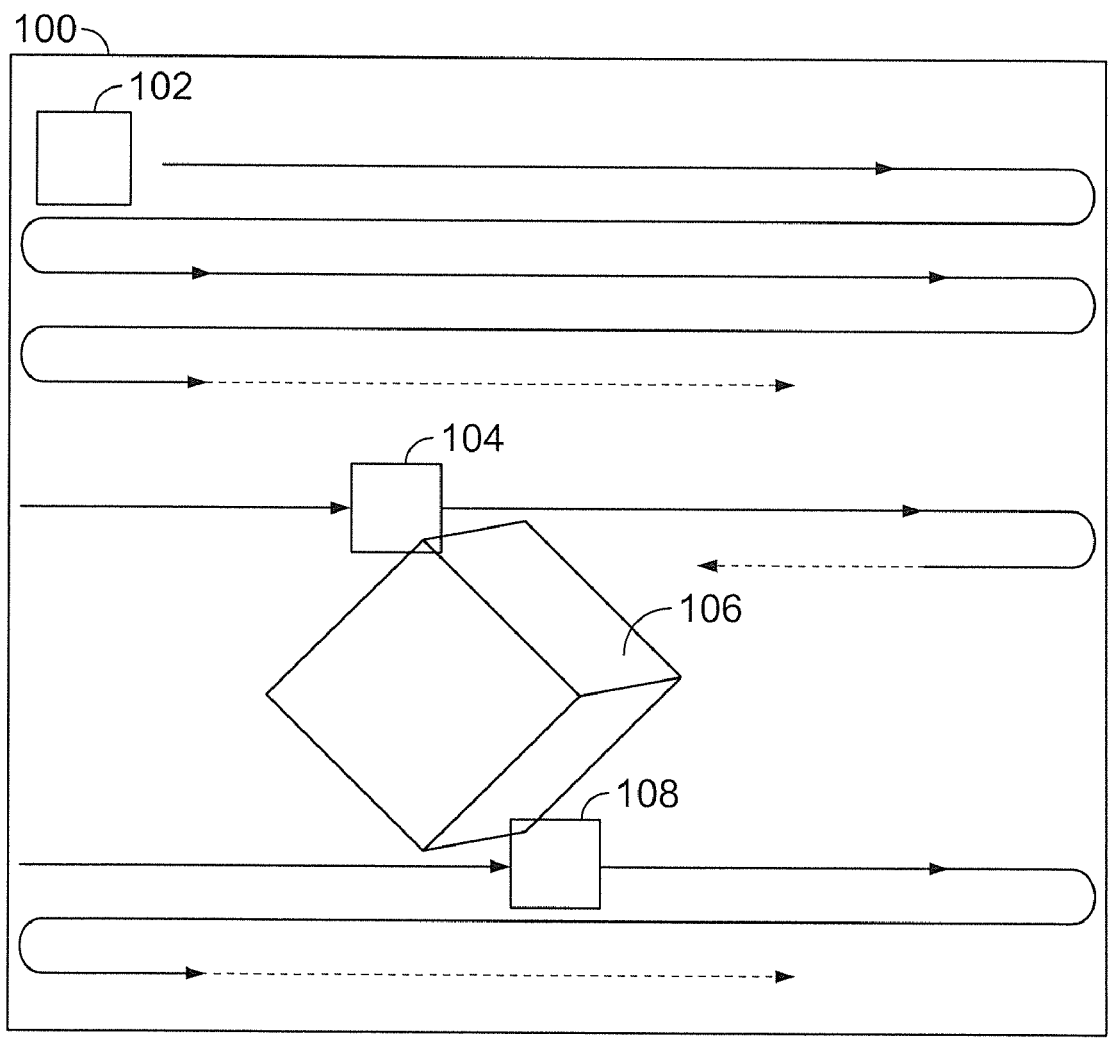
FIG. 1 is a diagram illustrating an aspect of the operation of a Reyes type rendering system.

The input to a Reyes renderer is a set of objects with their bounding boxes. The renderer runs though all of the pixels in an image in scanline order, and checks each bounding box against each pixel or pixel bucket. A pixel bucket is considered to be 32×32 pixels. An example of this is illustrated in FIG. 1. In the illustrated display 100, the renderer begins with a first pixel bucket 102 and proceeds in scanline order.

If the bounding box intersects that pixel or pixel bucket, it requests that the entire associated object be loaded into memory. That is, when a Reyes renderer hits a bucket that intersects a bounding box, then all of the data and the entire geometry of the bounding box is loaded into memory. Once that last pixel that overlaps the bounding box is processed, the system requests that the object be removed from memory. In this way, a Reyes rendering system attempts to keep its memory requirements low.

So in FIG. 1, for example, the pixel bucket 104 is the first one that intersects the bounding box 106. At that point all of the data and the entire geometry of the bounding box 106 is loaded into memory. The pixel bucket 108 is the last to overlap the bounding box 106. Once it is processed, the system dumps the data for the bounding box 106 from memory.

Reyes renderers, however, are not very efficient for rendering large sets of particle data (e.g. snow, sand, dust, etc.). One problem is that in some cases, it is not practical to generate all of the data that will be rendered up front because the storage requirements are prohibitive. Particle instancing is often used in these situations. With particle instancing a certain number of particles are initially simulated, and then instancing is used during rendering to render a much larger number of particles. The simulated particles are used as input or seed particles. For example, 100,000 particles may initially be simulated, and then 100 to 1 instancing is used to render 10,000,000 particles. Instancing is useful because simulating large numbers of particles can be expensive. One problem with using a Reyes renderer in this scenario is that if particles are not generated before the render begins, there is no clear way to tell the rendering system what their bounding box will be.

Even if instancing is not used and all the particle data is generated up front, the bounding box will be very large and include an enormous amount of data. This is because particle systems tend to be very large and have relatively complex geometry that requires a lot of memory. All of the data for the entire particle system will be loaded into memory for the entire time the Reyes renderer works on pixels that overlap any portion of the bounding box or "particle cloud."

Figure 2:
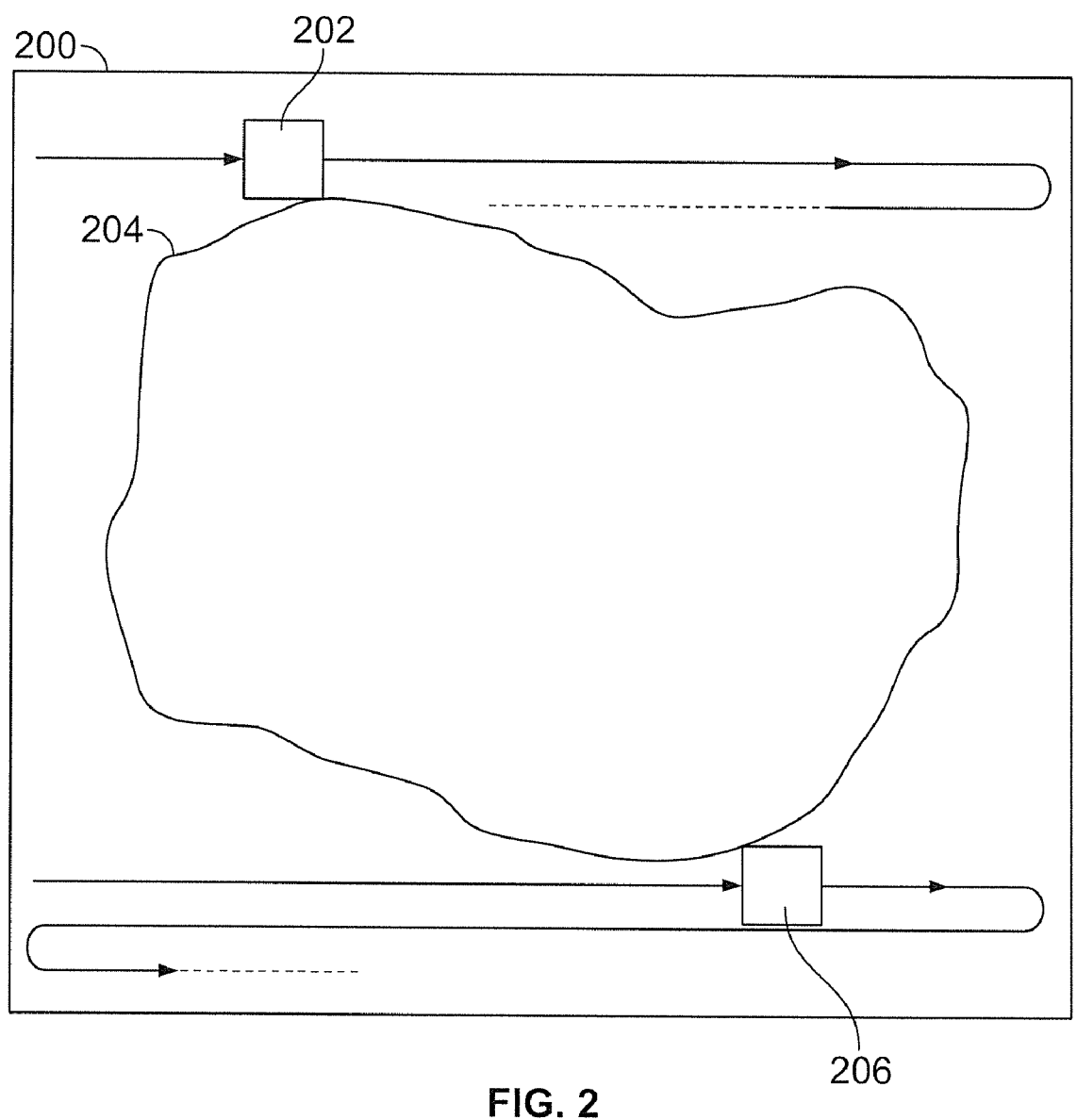
FIG. 2 is a diagram illustrating how a Reyes type rendering system handles a particle cloud.

An example of this is illustrated in FIG. 2. Namely, in the illustrated display 200, the pixel bucket 202 is the first one that intersects the particle cloud 204. At that point all of the data and the entire geometry of the particle cloud 204 is loaded into memory. The renderer then proceeds in scanline order. The pixel bucket 206 is the last to overlap the particle cloud 204. Once it is processed, the system dumps the data for the particle cloud 204 from memory. As illustrated, the data for the particle cloud 204 is kept in memory for nearly the entire screen due to the particle cloud 204 being so large. This does not produce very efficient rendering because most of the data loaded into memory will not even be required while any one pixel is being worked on.

There are other and better approaches to rendering huge particle data sets, but they require different types of rendering systems, rather than a scanline-type Reyes rendering system. Many high-end graphics companies use Reyes renderers today, even though they are not optimal for rendering large particle data sets. It is unlikely that this will change in the near future, given the investment studios make in building and maintaining their rendering pipelines.

Some of the embodiments of the present invention provide a method, system and/or framework that allows large sets of particle data (e.g. snow, sand, dust, etc.) to be rendered efficiently in a screen-space Reyes rendering system, such as RenderMan®. Therefore, a benefit of such embodiments is that they allow huge particle data sets and particle systems to be rendered on Reyes type renderers.

More specifically, one embodiment provides a method for predictively splitting procedurally generated particle data into screen-space boxes for rendering. The method uses a collection of programmable operators to generate particle geometry based on a much smaller set of input particles. The method also provides for programmable instancing. In some embodiments, the method may be implemented as a software plug-in for a Reyes rendering system.

The method works by breaking or chopping up large sets of particle data into smaller pieces. The smaller pieces of data are then fed to a Reyes renderer. Because the data is provided to the renderer in smaller pieces, the renderer is able to operate on smaller bounding boxes, which improves efficiency. Thus, the large set of particle data is predictively chopped up into smaller pieces that are then fed to the Reyes renderer one at a time. This way, when the Reyes renderer hits the bounding boxes it does not need more than a certain amount of particles in memory at any given time.

In some embodiments, the method may include three phases: the input phase, the prediction phase, and the splitting phase.

In the input phase, several items are provided to the system by the user. First, the input data is provided to the system. That is, the input particle system is provided to the system. An example of input data to the algorithm might be a small number of particles (e.g. <1 million). Next, the second item that is provided to the system is the instancing program. The instancing program defines and controls how one particle is turned into several or many particles. This allows for user programmable instancing. Thus, the actual rules for how to replace a single input particle with a set of output particles can be written by a user via a simple programming language. Then, the third item that is provided to the system is the maximum number of particles to be included in memory. Namely, the user specifies the maximum number of particles that is to be included in the memory of the Reyes renderer at any given time. This is a user-specified count and will be the maximum number of particles included in the each bounding box that the Reyes renderer works on.

In the prediction phase or stage, the system predicts the number and dimensions of generated particle data without actually executing particle generation code. That is, the system uses the input particle system and the provided instancing program and predicts the number of particles that will be generated and their bounding box, without actually knowing what the particles are. By predicting the number of particles that will be generated and their bounding box, this will indicate how much memory will be required by the Reyes renderer for that bounding box. If the generated number of particles exceeds the user-specified maximum number of particles, then the input particle system will be split up as described in the splitting phase below.

Prediction is performed by predictively running a collection of programmable operators. Namely, the instancing program is built from a class of several or many operators. The operators may run in sequence or in a row. Each operator takes input particles and returns output particles. The output of the class of operators might consist of each input particle replaced by a small cluster of particles, resulting in a much larger set of particles to render (e.g. 20:1 or more). This is why the prediction phases is used, i.e. to determine if the resulting larger set of particles exceeds the user-specified maximum number of particles for the Reyes renderer's memory.

Each operator performs a specific task. For example, one operator performs the actual instancing, another operator assigns colors, another operator randomly jitters the positions of the particles, another operator decides grain sizes based on a distribution of what the (e.g. sand) grain sizes are, etc.

Each operator includes a prediction mode. In the prediction mode, the operator is provided with an input bounding box and a particle count. The particle count is the number of particles from the input particle system for which the prediction is being made. The count may initially be all of the particles in the input particle system. In addition, the operator is provided with an average instance value for the particles and the maximum radius of the particles. The average instance value is the average number of particles that will be generated for each seed particle.

The operator then uses the provided information to predict what the output bounding box and particle count will be. For example, if the input particle count were 100, and the average instance value is 10, then the output particle count would be about 1,000 particles. In this way, the operator can predict the number of particles and the bounding box based on the provided information without having to actually know what the particles are or execute the particle generation code. That is, the operator is not actually run. Instead, the operator is predictively run. Thus, given an input bounding box and input particle count, the operator predicts the final output before the output is actually generated.

Again, the instancing program is built from several or many operators. The operator that performs the actual instancing will typically predict an increase in the size of the particle count and bounding box due to that instancing. But for an operator that assigns colors, for example, the size of the input particle count and bounding box will typically be the same as the output particle count and bounding box.

Thus, the input bounding box and input particle count is predictively run through each operator in the stack of operators to get the final prediction of the output bounding box and output particle count. The operators are not actually run; instead, the stack of operators are predictively run. In this way, a prediction is made of the resulting bounding box and particle count without actually generating them. That is, the system predicts what will be generated before it is actually generated.

Figure 3A:
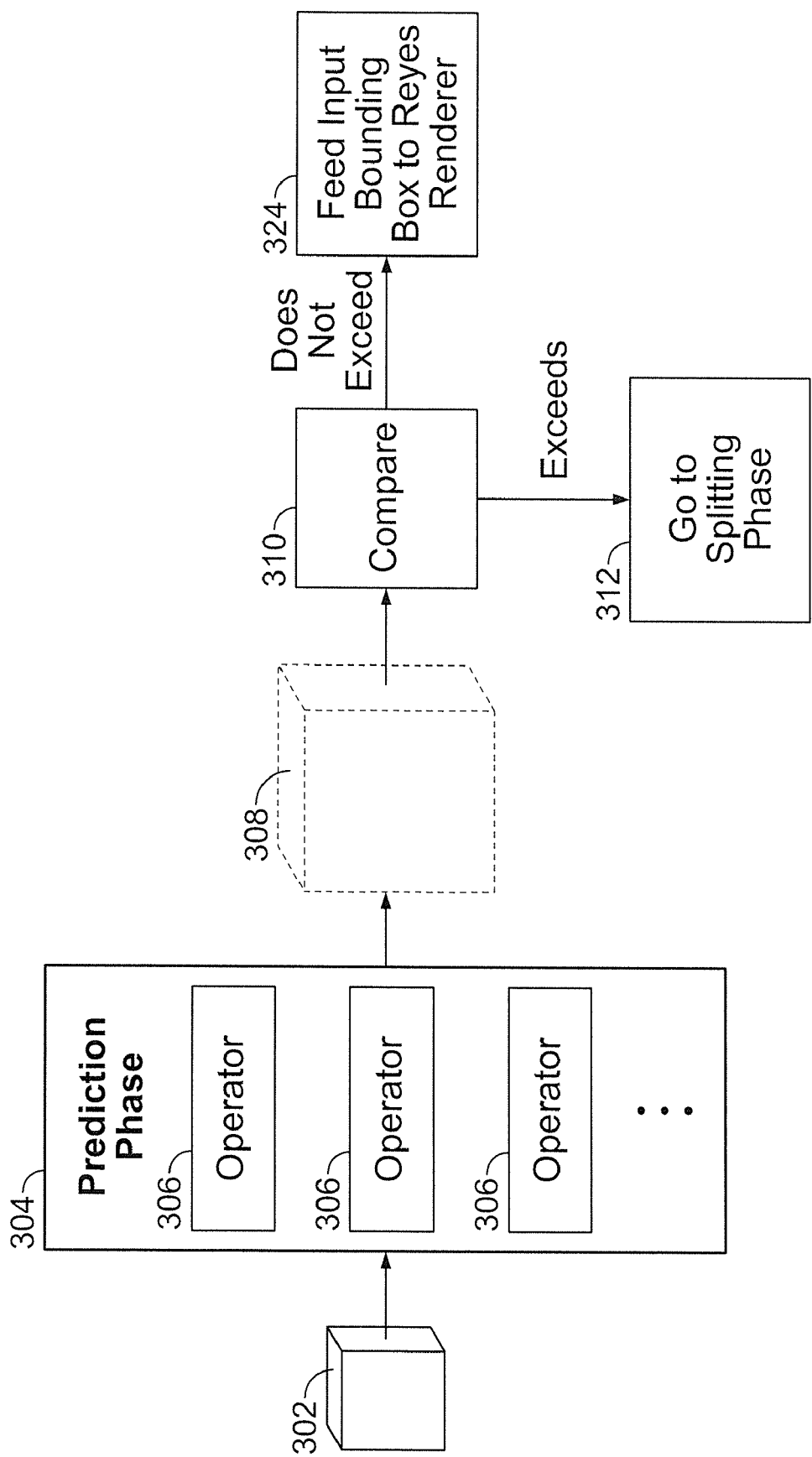
FIGS. 3A and 3B are diagrams illustrating a system flow operating in accordance with an embodiment of the present invention.

FIG. 3A illustrates an example system for performing this process in accordance with an embodiment of the present invention. Specifically, an input bounding box 302 is provided to a prediction phase or stage 304. The prediction phase includes several operators 306. The operators 306 are run in prediction mode, which results in a prediction of an output bounding box 308. The output bounding box 308 is shown in dashed lines to indicate that it is a prediction and not actually generated. The output bounding box 308 is larger than the input bounding box 302. For illustration purposes, it will be assumed that the particle count of the input bounding box 302 is 10,000 particles, and the particle count of the output bounding box 308 is 507,000 particles.

In the splitting phase or stage, the system recursively splits input particle data so that generated data will fit into screen-size boxes with maximum areas and with the allowable number of particles per box. That is, the system attempts to get the maximum areas per bounding box that it can manage and still stay within the allowable number of particles per box. Namely, if the above-described prediction phase results in the predicted output bounding box and output particle count exceeding the user-specified maximum number of particles for the Reyes renderer's memory, then the input bounding box and input particle count is split or chopped in half spatially, i.e. in screen space.

For example, assume that the user-specified maximum number of particles is 100,000. Furthermore, assume that the input particle count for the prediction phase is 10,000 particles. If the result of the prediction phase is that the generated particle count will be 507,000, then this exceeds the user-specified maximum number of particles of 100,000. Thus, the input bounding box for the prediction phase will be split spatially, which will result in two new input bounding boxes. The two new input bounding boxes are then each put through the prediction phase to see if further splitting is needed.

FIG. 3A illustrates an example of this process. Specifically, in a comparison stage 310, the particle count of the output bounding box 308 is compared to the user-specified maximum number of particles. If the particle count of the output bounding box 308 is 507,000, this exceeds the user-specified maximum of 100,000, and so the process proceeds to the splitting phase, which is indicted by box 312.

Figure 3B:
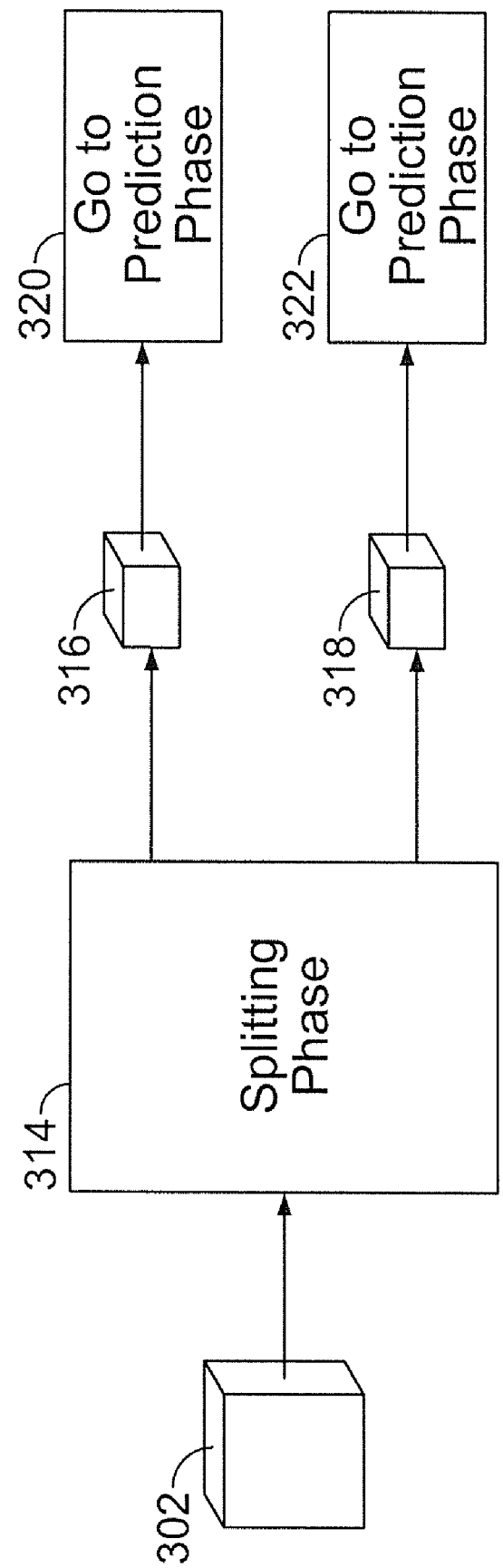

The splitting phase is illustrated in FIG. 3B. As shown, the input bounding box 302 is provided to a splitting phase or stage 314. In the splitting phase 314 the input bounding box 302 is split spatially, which results in two new input bounding boxes 316 and 318. In some embodiments, the spatial splitting is performed in screen space. That is, the spatial splitting is relative to the viewpoint, not world-space. The two new input bounding boxes 316 and 318 are then each put through the prediction phase 304, which is indicted by boxes 320 and 322. The two new input bounding boxes 316 and 318 are each put through the prediction phase 304 to check if either one of them requires further splitting.

The two new input bounding boxes 316, 318 will each probably have input particle counts being less than the particle count of the input bounding box 302, which was 10,000 particles. But this depends on the distribution of the particles in the original input bounding box 302. If the particles were distributed fairly evenly over the original input bounding box 302, then the new input particle count of each of the new input bounding boxes 316 and 318 may be roughly one-half, or about 5,000 particles. However, if the particles are distributed more heavily in one half of the original input bounding box 302, then there still may be a large number of particles (e.g. 9,000) in one of the split halves 316 and 318, which may require splitting again after the next prediction. Thus, the system recursively splits the input particle data until the generated data will fit into screen-size boxes with minimum areas and with the allowable number of particles per box.

The splitting of the bounding boxes may be similar to a tree. Namely, certain branches with heavy concentrations of particles will keep getting split into new branches. The tree may be unbalanced due to the heavy concentrations of particles in certain areas of the bounding boxes. Those heavily concentrated areas will generally need to be chopped up more times than less concentrated areas. Thus, if the prediction phase results in a particle count greater than the user-specified maximum, then the input bounding box is recursively split in half until the prediction phase for all the new bounding boxes indicates the resulting particle count is within the specified maximum.

FIG. 3A illustrates an example of what happens when the resulting particle count is within the specified maximum. Namely, if the comparison stage 310 determines that the particle count of the output bounding box 308 does not exceed the user-specified maximum number of particles, then the input bounding box may be fed to the rendering system, as is indicated by box 324.

In some embodiments, the bounding boxes, or "particle clouds," are split horizontally in screen space. Namely, when the bounding boxes are split during the splitting phase, they are split in a horizontal direction parallel to the scan lines of the display screen. This creates smaller "strips" of input bounding box data. This is useful because a Reyes renderer visits the tiles (or buckets) in scan line order.

Figure 4A:
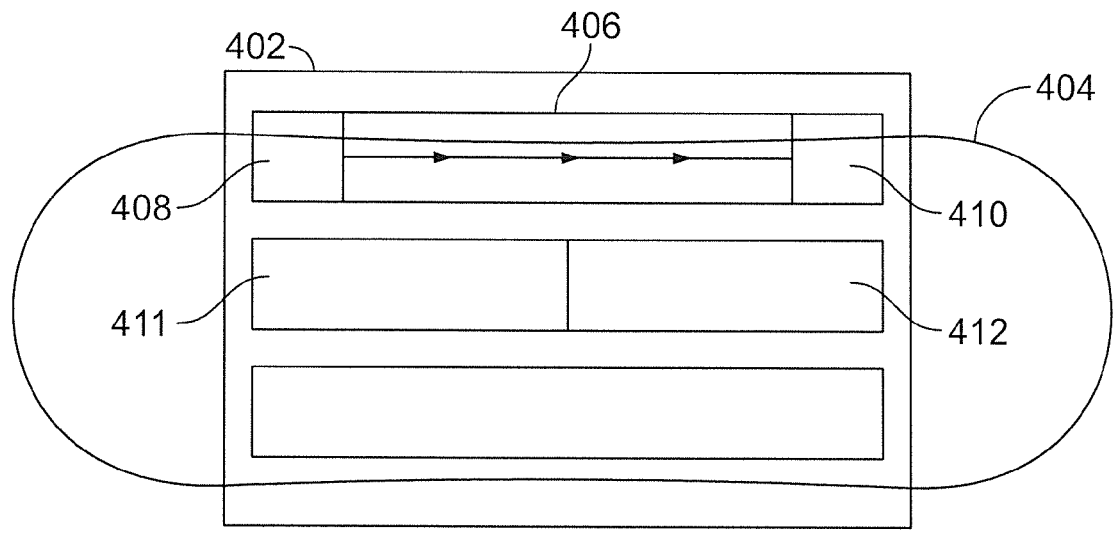
FIGS. 4A and 4B are diagrams illustrating a technique for use in accordance with an embodiment of the present invention.

An example of this is illustrated in FIG. 4A. Namely, the illustrated display 402 displays a portion of a particle cloud 404. A "strip" type input bounding box 406 is shown which has been generated according to the above-described embodiment of the present invention. The pixel bucket 408 is the first one that intersects the bounding box 406. At that point the data for only the bounding box 406 is loaded into memory. The renderer then proceeds in scanline order. The pixel bucket 410 at the end of the same scanline is the last to overlap the bounding box 406. Once it is processed, the system dumps the data for the bounding box 406 from memory.

Thus, by splitting the bounding boxes in a horizontal direction, the distance between the bounding box's first tile and last tile that the renderer hits is relatively small. With this technique the entire bounding box may be included in only one, a couple, or a few scan lines. As such, the data in the bounding box will only be required in the renderer's memory for a short time. Once the renderer is done with the bounding box it can unload all the particles and start the next bounding box.

Figure 4B:
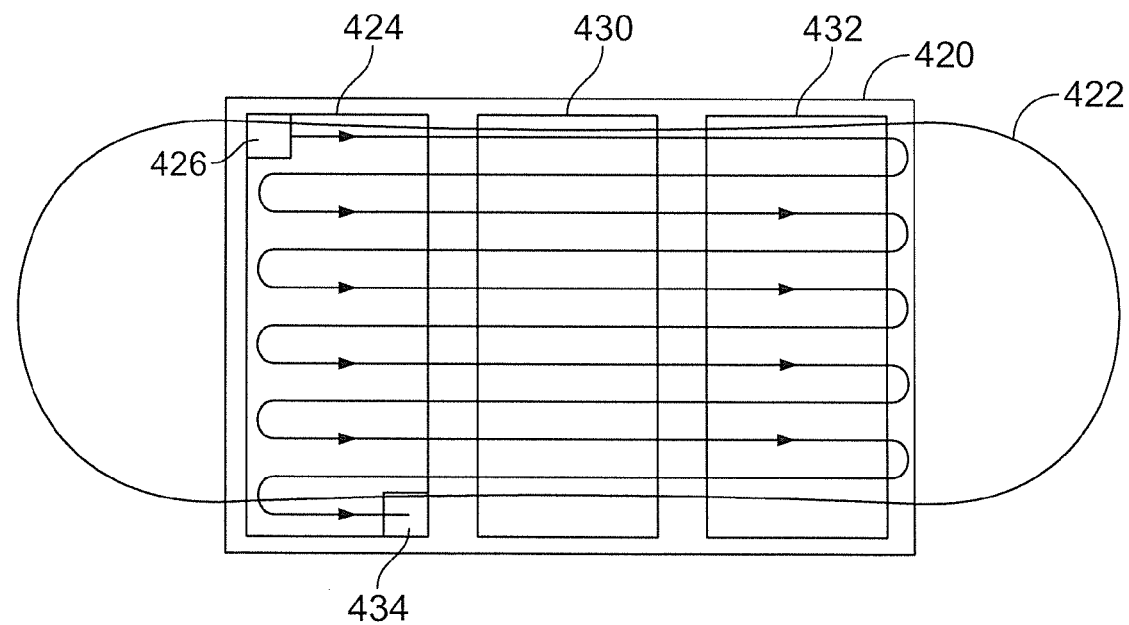

In contrast, if a bounding box were split in the vertical direction, the bounding box would traverse many scan lines, which means the distance between the bounding box's first tile and last tile that the renderer hits is relatively long. An example of this is illustrated in FIG. 4B. Namely, the illustrated display 420 displays a portion of a particle cloud 422. A vertically split input bounding box 424 is shown. The pixel bucket 426 is the first one that intersects the bounding box 424. At that point the data for the bounding box 424 is loaded into memory. The renderer then proceeds in scanline order. As shown, the renderer intersects other bounding boxes 430 and 432 and must process many scanlines before reaching the pixel bucket 434, which is the last to overlap the bounding box 424. As such, the data in the bounding box 424 will be required in the renderer's memory for a long time. And during that time the renderer will also attempt to load into memory the data from the other intersected bounding boxes 430 and 432. This will require a lot of memory and will slow down the system.

Therefore, the bounding box data is preferably split horizontally so that the Reyes renderer can be done working on the bounding box within as few scan lines as possible. For example, the renderer may be able to start a new bounding box on every scan line or every few scan lines. When the renderer is done with each bounding box it can dump the data from memory and start the next bounding box. Splitting horizontally will reduce the chances of the renderer hitting another bounding box before finishing the current bounding box.

In some embodiments, the screen-space splitting algorithm may include an additional aspect or feature. Specifically, when the split bounding box is less than the height of a pixel bucket, then further horizontal splits do not improve memory usage. In this scenario, the algorithm may switch to vertical splitting. For example, if the split bounding box located just below bounding box 406 (FIG. 4A) still had too many particles, it would be split into a left and right half, thus forming bounding boxes 411 and 412. The left half bounding box 411 would be released by the renderer before the right half bounding box 412 is loaded. That is, the bounding box 411 gets unloaded by the last pixel bucket of that bounding box before the bounding box 412 gets loaded. Similar to horizontal splitting stopping and switching to vertical splitting when the height of the bounding box reaches the size of a bucket, vertical splitting stops at the width of a bucket. At this point there is no further memory savings.

In some embodiments, there are additional minor optimizations that cache intermediate steps to disk to further lower the total memory requirements. For example, in some embodiments, the results of the above-described splitting may be cached to a hard drive, and markers may be placed in the screen graph. Then, on a per tile basis, particles may be loaded from this cache as needed, render data generated, and then data cleared from memory. The result is that upwards of 50 G worth of particle data can be rendered on a computer with only 4 G of memory in a traditional scanline-based Reyes renderer, such as for example RenderMan®.

Therefore, a method for predictively splitting procedurally generated particle data into screen-space boxes for rendering has been described. As described, for a given input particle system, a prediction phase is used to determine how large the resulting bounding box and particle count will be for a given instancing program. The system is able to accurately predict the bounding box of the particles in each group before the final particles have actually been generated.

If the particle count exceeds a predefined maximum, then the system recursively pre-splits the input particle system into smaller pieces to create smaller input bounding boxes. The splitting continues until the prediction phase predicts particle counts within the maximum count. Furthermore, the splitting is preferably performed horizontally in screen space. This creates smaller "strips" of input bounding boxes. Thus, some embodiments include a method for partitioning the input particle data into many smaller groups so that the resulting final particles per group will be under some user-specified count.

Then, the small strips of input particle data are fed to a Reyes rendering system. Thus, the particle geometry is specified to the Reyes rendering system in smaller pieces. The particle data is provided to the renderer in the order it needs them. When a Reyes renderer is fed with the split up pieces of input particle data as a bounding box, the renderer is able to operate very efficiently because it is able to unload the data for each bounding box very quickly. This is much more efficient than the way a conventional Reyes rendering system operates.

Figure 5:
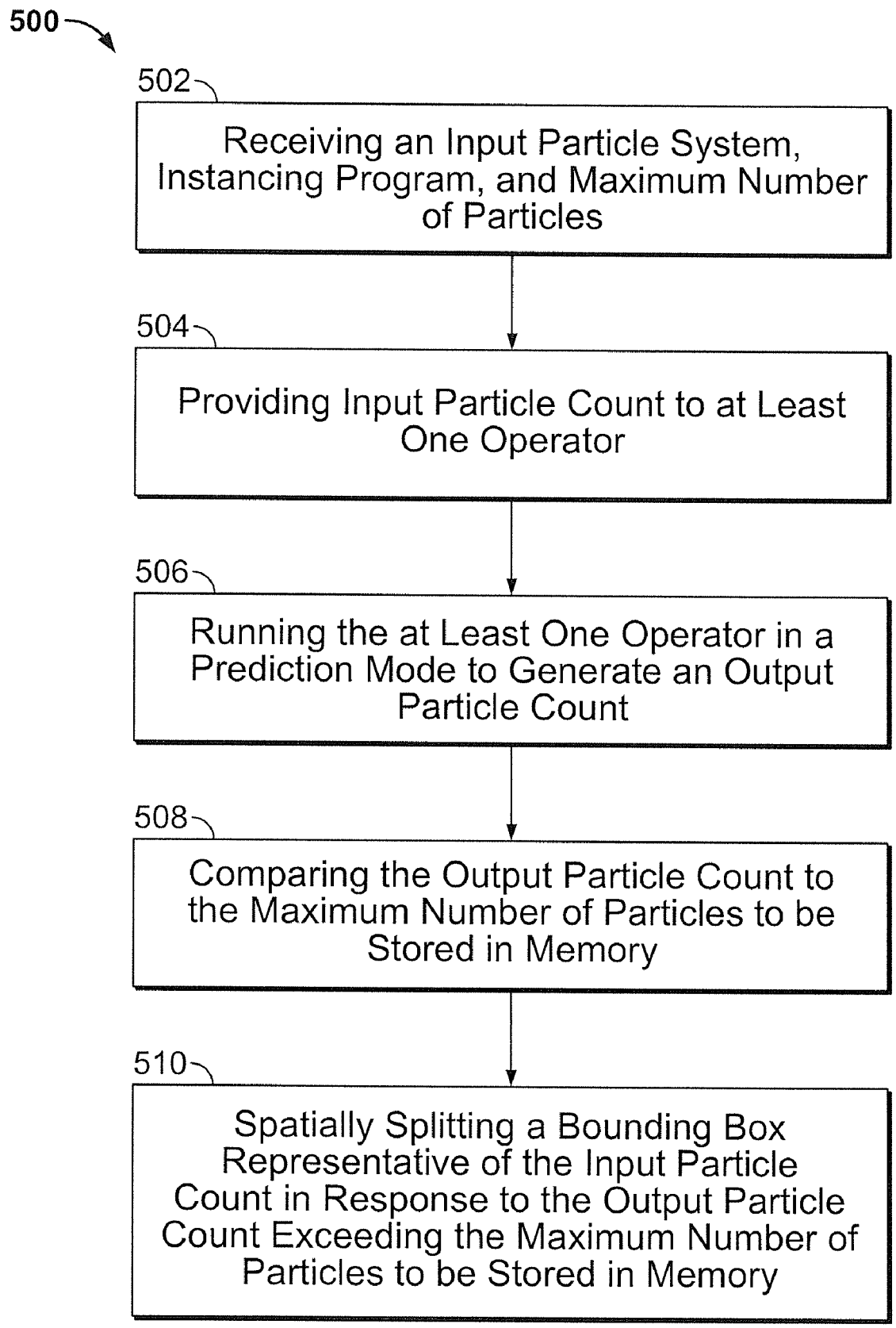
FIG. 5 is a flow diagram illustrating a method for use in rendering in accordance with an embodiment of the present invention.

FIG. 5 illustrates a method 500 for use in rendering in accordance with an embodiment of the present invention. In step 502 an input particle system, an instancing program, and a number indicating a maximum number of particles to be stored in memory is received. In step 504 an input particle count representative of at least a portion of the input particle system is provided to at least one operator for the instancing program. In step 506 the at least one operator is run in a prediction mode to generate an output particle count. In step 508 the output particle count is compared to the number indicating a maximum number of particles to be stored in memory. In step 510 a bounding box representative of the input particle count is spatially split in response to the output particle count being greater than the number indicating a maximum number of particles to be stored in memory. In some embodiments, the spatial splitting is performed in screen space relative to the viewpoint.

In some embodiments, the above-described methods and/or techniques may be implemented as a software plug-in or other module for a Reyes type rendering system, such as for example, Pixar's RenderMan® product.

Particle rendering is an important topic, and data sets are always getting larger. As such, the above-described methods and techniques are believed to solve an important problem that will prove useful around the industry for at least the next several years. This is because, as discussed above, the industry continues to use Reyes type rendering systems. Even though different types of rendering systems may be more efficient for rendering large particle datasets, various companies and studios may be unlikely to adopt those systems in view of the prevalence of Reyes type rendering systems. The above-described methods and techniques are believed to substantially improve the performance of Reyes type rendering systems for rendering large particle datasets.

It is noted that in some embodiments, each generated particle has attributes that may include position, velocity, radius, and instance number. The instance number specifies how many render instances are wanted. Thus, when the generation code is actually run, the instancing program can be programmed to provide, for example, a certain number of particles with random jitter within a certain radius of the seed particle.

Figure 6:
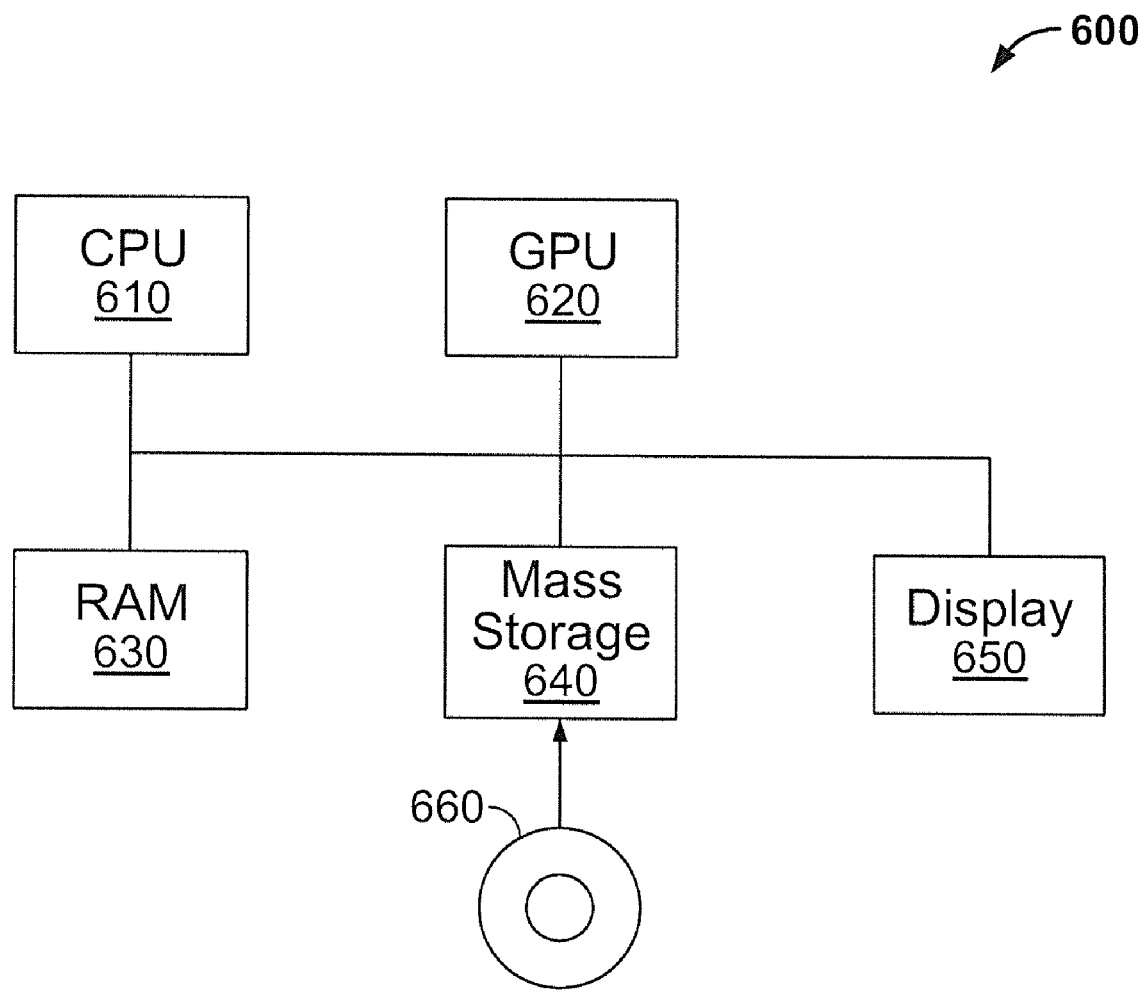
FIG. 6 is a block diagram illustrating a processor based system that may be used to run, implement and/or execute the methods and/or techniques shown and described herein in accordance with embodiments of the present invention.

The methods and techniques described herein may be utilized, implemented and/or run on many different types of systems. Referring to FIG. 6, there is illustrated a system 600 that may be used for any such implementations. One or more components of the system 600 may be used for implementing any system or device that, for example, executes a method for predictively splitting procedurally generated particle data into screen-space boxes, as described above. However, the use of the system 600 or any portion thereof is certainly not required.

By way of example, the system 600 may include, but is not required to include, a central processing unit (CPU) 610, a graphics processing unit (GPU) 620, a random access memory (RAM) 630, and a mass storage unit 640, such as a disk drive, and a display 650. The system 600 comprises an example of a processor based system.

The CPU 610 and/or GPU 620 may be used to execute or assist in executing the steps of the methods and techniques described herein, and various program content, particle systems, bounding boxes, images, surfaces, animations, avatars, representations, communities, interfaces, etc. may be rendered on the display 650. Removable storage media 660 may optionally be used with the mass storage unit 640, which may be used for storing code that implements the methods and techniques described herein, such as code for predictively splitting particle data as described above. However, any of the storage devices, such as the RAM 630 or mass storage unit 640, may be used for storing such code. For example, any of such storage devices may serve as a tangible computer storage medium for embodying a computer program for causing a computer, system, console, or other processor based system to execute or perform the steps of any of the methods, code, and/or techniques described herein. Furthermore, any of the storage devices, such as the RAM 630 or mass storage unit 640, may be used for storing any needed database(s).

In some embodiments, one or more of the methods and/or techniques described above may be implemented in a computer program, plug-in, or other software module executable by a processor based system. By way of example, a processor based system may comprise any type of system having one or more processors, such as the above-described system 600 or similar system, a computer, DVD player, Blu-ray disc player, entertainment system, game console, etc. Such computer program may be used for executing various steps and/or features of the above-described methods and/or techniques. In some embodiments, software modules within the computer program or plug-in may be used for executing various steps and/or features of the above-described methods and/or techniques.

For example, a plug-in or computer program in accordance with an embodiment of the present invention may implement a method for use in rendering, comprising: receiving an input particle system, an instancing program, and a number indicating a maximum number of particles to be stored in memory; providing an input particle count representative of at least a portion of the input particle system to at least one operator for the instancing program; running the at least one operator in a prediction mode to generate an output particle count; comparing the output particle count to the number indicating a maximum number of particles to be stored in memory; and spatially splitting a bounding box representative of the input particle count in response to the output particle count being greater than the number indicating a maximum number of particles to be stored in memory.

Such computer programs or plug-ins may be stored or embodied in any type of computer readable storage or recording medium. By way of example, such computer readable storage medium may include, but is not limited to, any type of computer memory or storage, such as main memory, local memory, ROM, RAM, mass storage, hard disk drive, network storage, USB storage, Blu-ray disc, digital video disk (DVD), compact disk (CD), floppy disk, etc.

The above description is not to be taken in a limiting sense, but is made merely for the purpose of describing the general principles of exemplary embodiments. The scope of the invention should be determined with reference to the claims.

What is claimed is:

1. A method for use in rendering, comprising:
    receiving an input particle system, an instancing program, and a number indicating a maximum number of particles to be stored in memory;
    providing an input particle count representative of at least a portion of the input particle system to at least one operator for the instancing program;
    running the at least one operator in a prediction mode prior to any particles being generated, to predict the size of an output bounding box by
        generating an output particle count corresponding to each operator without running the at least one operator to generate output particles; and
        determining a final output particle count, in view of the output particle count corresponding to each operator, wherein the predicted size of the output bounding box is representative of the final output particle count;
    comparing the final output particle count to the number indicating a maximum number of particles to be stored in memory; and
    spatially splitting an input bounding box representative of the input particle count in response to the final output particle count being greater than the number indicating a maximum number of particles to be stored in memory.

2. The method of claim 1, wherein the spatial splitting is performed in screen space.

3. The method of claim 2, wherein the spatial splitting is performed horizontally in screen space.

4. The method of claim 1, wherein:
    the step of spatially splitting results in two or more new bounding boxes; and
    the method further comprises providing the two or more new bounding boxes to a rendering system.

5. The method of claim 4, wherein the rendering system comprises a Reyes type rendering system.

6. The method of claim 1, wherein:
    the step of spatially splitting results in two or more new bounding boxes; and
    the steps of running, comparing, and spatially splitting are repeated for each of the two or more new bounding boxes.

7. The method of claim 1, further comprising:
    providing an average instance value and a maximum radius to the at least one operator for the instancing program.

8. A method for use in rendering, comprising:
    receiving an input particle system, an instancing program, and a number indicating a maximum number of particles to be stored in memory;

providing an input particle count representative of at least a portion of the input particle system to at least one operator for the instancing program;

running the at least one operator in a prediction mode to generate an output particle count;

comparing the output particle count to the number indicating a maximum number of particles to be stored in memory; and spatially splitting a bounding box representative of the input particle count in response to the output particle count being greater than the number indicating a maximum number of particles to be stored in memory;

wherein the spatial splitting is performed vertically in screen space if a height of the bounding box is less than a height of a pixel bucket.

9. A non-transitory computer readable storage medium storing a computer program executable by a processor based system, the computer program causing the processor based system to execute steps comprising:

receiving an input particle system, an instancing program, and a number indicating a maximum number of particles to be stored in memory;

providing an input particle count representative of at least a portion of the input particle system to at least one operator for the instancing program;

running the at least one operator in a prediction mode prior to any particles being generated, to predict the size of an output bounding box by generating an output particle count corresponding to each operator without running the at least one operator to generate output particles; and determining a final output particle count, in view of the output particle count corresponding to each operator, wherein the predicted size of the output bounding box is representative of the final output particle count;

comparing the final output particle count to the number indicating a maximum number of particles to be stored in memory; and spatially splitting an input bounding box representative of the input particle count in response to the final output particle count being greater than the number indicating a maximum number of particles to be stored in memory.

10. The non-transitory computer readable storage medium of claim 9, wherein the spatial splitting is performed in screen space.

11. The non-transitory computer readable storage medium of claim 10, wherein the spatial splitting is performed horizontally in screen space.

12. The non-transitory computer readable storage medium of claim 9, wherein:

the step of spatially splitting results in two or more new bounding boxes; and the computer program further causing the processor based system to execute a step comprising providing the two or more new bounding boxes to a rendering system.

13. The non-transitory computer readable storage medium of claim 12, wherein the rendering system comprises a Reyes type rendering system.

14. The non-transitory computer readable storage medium of claim 9, wherein:

the step of spatially splitting results in two or more new bounding boxes; and the steps of running, comparing, and spatially splitting are repeated for each of the two or more new bounding boxes.

15. The non-transitory computer readable storage medium of claim 9, further comprising:

providing an average instance value and a maximum radius to the at least one operator for the instancing program.

16. A non-transitory computer readable storage medium storing a computer program executable by a processor based system, the computer program causing the processor based system to execute steps comprising:

receiving an input particle system, an instancing program, and a number indicating a maximum number of particles to be stored in memory;

providing an input particle count representative of at least a portion of the input particle system to at least one operator for the instancing program;

running the at least one operator in a prediction mode to generate an output particle count;

comparing the output particle count to the number indicating a maximum number of particles to be stored in memory; and spatially splitting a bounding box representative of the input particle count in response to the output particle count being greater than the number indicating a maximum number of particles to be stored in memory;

wherein the spatial splitting is performed vertically in screen space if a height of the bounding box is less than a height of a pixel bucket.

17. An apparatus for use in rendering, comprising:

means for receiving an input particle system, an instancing program, and a number indicating a maximum number of particles to be stored in memory;

means for providing an input particle count representative of at least a portion of the input particle system to at least one operator for the instancing program;

means for running the at least one operator in a prediction mode prior to any particles being generated, to predict the size of an output bounding box, comprising means for generating an output particle count corresponding to each operator without running the at least one operator to generate output particles; and means for determining a final output particle count, in view of the output particle count corresponding to each operator, wherein the predicted size of the output bounding box is representative of the final output particle count;

means for comparing the final output particle count to the number indicating a maximum number of particles to be stored in memory; and means for spatially splitting an input bounding box representative of the input particle count in response to the final output particle count being greater than the number indicating a maximum number of particles to be stored in memory.

18. The apparatus of claim 17, wherein the spatial splitting is performed in screen space.

19. The apparatus of claim 18, wherein the spatial splitting is performed horizontally in screen space.

20. The apparatus of claim 17, wherein:

the spatially splitting results in two or more new bounding boxes; and the apparatus further comprising means for providing the two or more new bounding boxes to a rendering system.

21. The apparatus of claim 20, wherein the rendering system comprises a Reyes type rendering system.

22. The apparatus of claim 17, wherein:

the spatially splitting results in two or more new bounding boxes; and the running, comparing, and spatially splitting are repeated for each of the two or more new bounding boxes.

23. The apparatus of claim 17, further comprising:
means for providing an average instance value and a maximum radius to the at least one operator for the instancing program.

24. An apparatus for use in rendering, comprising:
means for receiving an input particle system, an instancing program, and a number indicating a maximum number of particles to be stored in memory;
means for providing an input particle count representative of at least a portion of the input particle system to at least one operator for the instancing program;
means for running the at least one operator in a prediction mode to generate an output particle count;
means for comparing the output particle count to the number indicating a maximum number of particles to be stored in memory; and
means for spatially splitting a bounding box representative of the input particle count in response to the output particle count being greater than the number indicating a maximum number of particles to be stored in memory;
wherein the spatial splitting is performed vertically in screen space if a height of the bounding box is less than a height of a pixel bucket.

* * * * *